Figure 1:
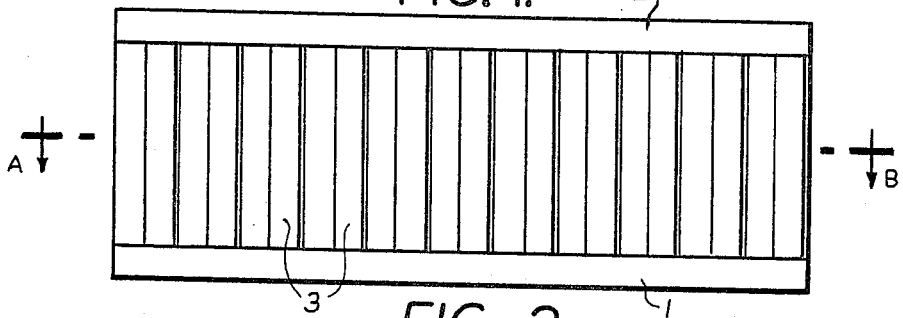

Nov. 8, 1966  K. RAU  3,283,655
LIGHT WEIGHT OPTICAL MIRROR WITH SPACED PLATES
CONNECTED BY TROUGH-LIKE ELEMENTS
Filed May 1, 1962

INVENTOR
KARLHEINZ RAU
BY
Burgess, Dinklage & Sprung
ATTORNEYS.

ously to one side. Although this dissociation may be slight under normal conditions, it assumes considerable proportions in the event of large oscillations and vibrations, to which a mirror would be subjected, for example, in rockets, where these vibrations may in certain circumstances fall within the range of mechanical resonance and cause disturbances in the mirror with consequential lack of dynamic stability.

United States Patent Office 3,283,655
Patented Nov. 8, 1966

3,283,655
LIGHT WEIGHT OPTICAL MIRROR WITH SPACED PLATES CONNECTED BY TROUGH-LIKE ELEMENTS
Karlheinz Rau, Hanau am Main, Germany, assignor to Heraeus Quarzschmelze G.m.b.H., Hanau am Main, Germany, a corporation of Germany
Filed May 1, 1962, Ser. No. 191,475
Claims priority, application Germany, Sept. 16, 1961, H 43,665
3 Claims. (Cl. 88—105)

Concave optical mirrors used for focussing light rays and for image formation, require an exceptionally high degree of accuracy. This desideratum is, of course, shared by plane mirrors for deflecting parallel rays. Variations in ambient temperature conditions, which occur particularly when using the mirror in the atmosphere, and mechanical influences, especially vibrations, can in certain circumstances, produce such a modification of the optically worked surface of the mirror that it can no longer be used as part of a precision instrument.

With a view especially to eliminating deformation and consequent unevenness in the reflecting surface when using very large mirrors, and in order to guarantee constancy of the optical surface and stability of the mirror, various suggestions have already been made both in respect of materials as well as the actual construction and although these resulted in significant improvements, generally speaking various requirements remained unsatisfied.

Quartz glass has been used for many years as a material for valuable precision mirrors because it has a much smaller coefficient of expansion than other glasses. In order that quartz mirrors should not be too heavy but still have maximum stability, more attention has been paid to the supporting structure of the mirror, and this has led to the production of so-called light weight mirrors.

By light weight mirrors are meant mirrors which are primarily used in high quality optical systems, for example, astronomical telescopes. They consist either of a relatively thin reflecting face plate provided with a supporting structure whose rear is generally provided with a backing plate in order to increase the stability, or a supporting structure is arranged between two plates, one of which is provided with the optically worked reflecting surface.

Hitherto, supporting structures have been manufactured either from a thick plate or from individual supporting elements joined by plates. Whereas the first arrangement can only be put into practice with considerable difficulty, particularly when using quartz glass, the second is considerably more simple and enables precision mirrors producing good results to be manufactured.

Separate rods, blocks, cubes and so on have been used as supporting elements, and recently tubular members have been suggested, for connection between the front and rear plates. It has also been proposed to arrange tubular supporting elements so closely together that they merge one into the other and constitute a network of regularly-shaped holes, for example a honeycomb system.

Such supporting elements which are co-adjacently arranged so closely have, nevertheless, certain major disadvantages. They generally have quite thick walls, usually as a result of the manufacturing process, so that attempts to keep the weight of the mirror to a minimum are either completely unsuccessful or only successful in certain circumstances. In addition they have proved themselves to be inadequately stable dynamically, particularly when under mechanical loads, under which conditions the individual supporting elements become dissociated to one side. Although this dissociation may be slight under normal conditions, it assumes considerable The present invention has for an object the construction of a light weight mirror which is substantially stable dynamically, in particular for astronomical telescopes, and having a supporting frame which does not tend to become dissociated even under large dynamic loads, and which is light in weight and yet has maximum stability and which meets practical requirements to a marked degree.

According to the invention, an optical mirror, particularly for an astronomical telescope, comprises a reflecting surface and a backing plate interconnected by a supporting frame, said frame consisting of trough-like elements, the free edges of which are fused to the backs of the co-adjacent elements located in front thereof at an angle which is at least a right angle.

The whole structure may be made from a quartz material, preferably quartz glass, and the reflecting surface may be in the form of an optically pure quartz glass plate.

Alternatively, only the backing plate and supporting frame may be made from a quartz material.

Figure 2:
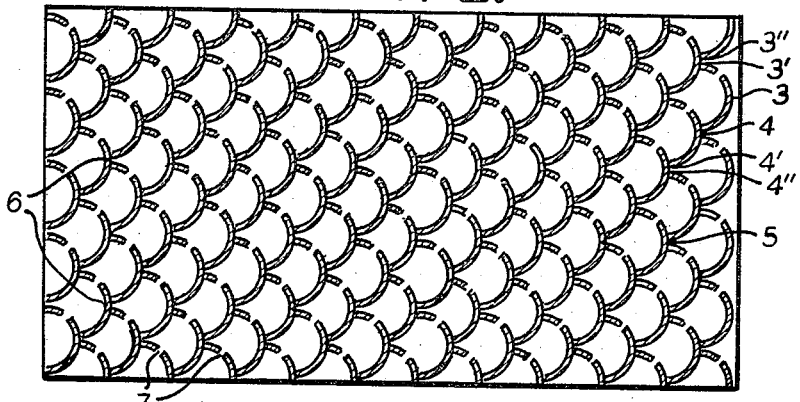
Figure 3:
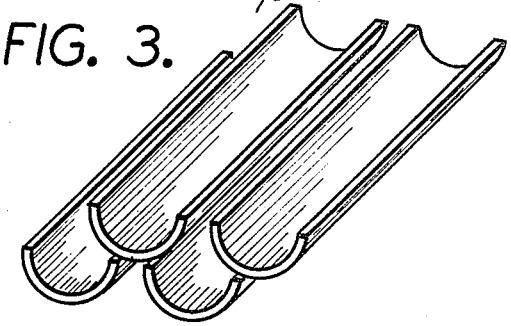
Figure 5:
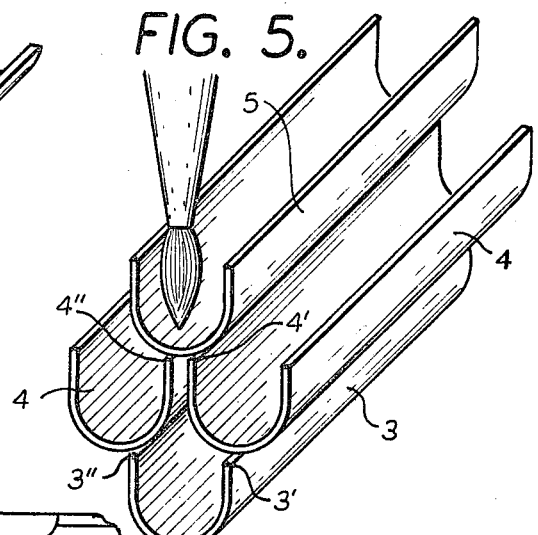
Figure 4:
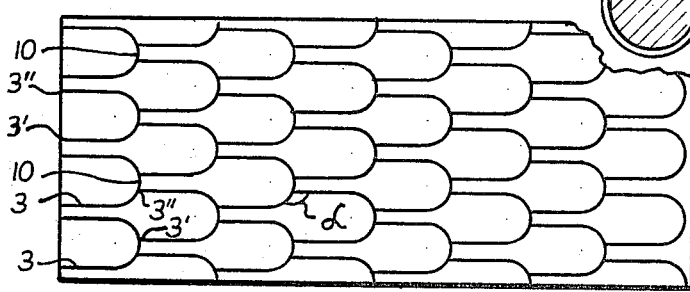

In order that the invention may be more clearly understood, reference will now be made to the accompanying drawings which show some embodiments thereof by way of example and in which:

FIGURE 1 shows a side view of a complete mirror,
FIGURE 2 shows a section along the line A–B of FIGURE 1,
FIGURE 3 shows a perspective view of some of the supporting elements,
FIGURE 4 shows a plan view of a further embodiment of supporting elements, and
FIGURE 5 shows a perspective view of the manner in which the supporting elements may be fused together.

Referring to the drawings, in FIGURE 1 a front or reflecting plate 1 is joined to a backing or base plate 2, both made from quartz glass, by means of a supporting frame constructed from semi-cylindrical trough-like elements 3, also made from quartz glass.

The section according to FIGURE 2 shows the individual elements 3, the free edges 3' and 3" of which are fused to the backs of the elements 4 located in front thereof, the free edges 4' and 4" of which are in turn joined to the element 5 located in front thereof, and so on. Ventilation holes 6 or notches 7 are preferably formed in the elements, to enable the air pressure to be balanced both when manufacturing and using the mirror.

The supporting frame structure in accordance with the invention may also comprise elements having a section other than the semi-cylindrical elements of FIGURES 1 and 2: for example they may include part-oval sectioned elements as shown in FIGURE 4, these being fused along their free edges as hereinbefore described with reference to FIGURES 1 and 2.

FIGURE 5 shows another perspective view of the part of the supporting frame comprising semi-cylindrical elements, wherein a welding torch, in greatly simplified form, is shown to demonstrate the manner in which the elements may be formed. The free edges 3' and 3" of the element 3 are assumed to be already fused to the element 4: in the step shown, the free edges 4" and 4' are being fused from above to the element 5, the welding torch being conducted above the deepest part of the trough-like element to effect the fusion. The element 3 which has already been fused is not influenced by this step; as it remains cold the stresses are small.

Thus, the invention provides an optical mirror comprising two plates disposed in spaced, confronting relation, and wherein the outwardly disposed surface of one of the plates is a reflecting surface. Supporting means are disposed between and interconnect the plates and support the plate having a reflecting surface on the other of the plates. Referring to FIG. 4, the supporting means comprises a plurality of elongated, trough-like elements 3 each having two sides which terminate in free axially extending edges 3', 3'', which define a front of the trough-like elements. The said elements further include the backs or connecting members 10, which interconnect the sides of the trough-like elements. The elements are disposed with the axes thereof transverse to the planes of the plates, and with the fronts thereof facing in the same direction. Further, the trough-like elements are disposed in a plurality of rows each including a plurality of the trough-like elements. The elements in each row are in offset relation in respect to the trough-like elements of the next adjacent row in front thereof, and have the free edges thereof fused to the connecting members of the trough-like elements of the row in front thereof. Each connecting member has two free edges fused thereto, one from each of two next adjacent trough-like elements. The two free edges fused to each connecting member are spaced apart. Also, the inner angle, $\alpha$, between each trough-like element side and the connecting member to which it is secured is at least a right angle.

The invention is not restricted to the examples given. In the same manner quartz glass is only given as an example of a suitable material. In place of quartz glass, in particular for manufacturing the base plate and supporting frames, other quartz materials may be used, as may any other material having a relatively low coefficient of expansion. The particular advantage of a precision mirror having a supporting structure made from trough-like elements lies in that the construction is fully fused but has low stresses. The fused parts of the mirror are co-adjacently arranged at right angles or at a larger angle, but never at an acute angle, so that the danger of notching or cracking under dynamic loads is substantially eliminated. The already completed cells of the supporting frame formed by the fusion of the elements are only slightly influenced by the fusion of the further elements and consequently almost no stresses occur whereas previously these were the cause of flaws. It has been shown that after more than 500 welding operations when making a mirror in accordance with the invention, not one flaw occurred.

Apart from these features, which are particularly important for a precision mirror, the mirror in accordance with the invention has the further essential advantage that it constitutes a considerable advance when used in rockets. Whereas the supporting frame previously used, leaving a closed cell system as referred to above, required a minimum wall thickness of from 3 to 4 mm., the trough-like elements used in accordance with the present invention only require wall thicknesses of from 0.5 to 2 mm. This results in a considerable saving in weight without in any way decreasing stability. The reduction in wall thicknesses of the supporting elements results in a considerably reduced heat conductivity due to the reduction in weight, whereby a rapid temperature equalisation, as would be necessary for use in the stratosphere, is made possible.

The bores or notches in the walls of the supporting structure provided for pressure compensation purposes may be very small so that they cause no noticeable loss of stability.

The embodiments of the invention in which an exclusive property or privilege is claimed are defined as follows:

1. An optical mirror comprising:
   (a) two plates disposed in spaced, confronting relation, the outwardly disposed surface of one of said plates being a reflecting surface,
   (b) supporting means disposed between and interconnecting said plates and supporting the plate having a reflecting surface on the other of said plates,
   (c) said supporting means comprising a plurality of elongated, trough-like elements each having two sides having free axially extending edges defining a front thereof, and a connecting member interconnecting said sides,
   (d) said trough-like elements being disposed with the axes thereof transverse to the planes of said plates and with the fronts thereof facing in the same direction, and in a plurality of rows each including a plurality of the trough-like elements,
   (e) the trough-like elements in each row being in offset relation in respect to the trough-like elements of the next adjacent row in front thereof and having the free edges thereof fused to connecting members of the trough-like elements of the row in front thereof with each connecting member having two free edges fused thereto one from each of two next adjacent trough-like elements, the two free edges fused to each connecting member being spaced apart, the inner angle between each trough-like element side and the connecting member to which it is secured being at least a right angle.

2. A mirror as claimed in claim 1 wherein the trough-like elements of the supporting frame are substantially semi-cylindrical in shape.

3. A mirror as claimed in claim 1 wherein the trough-like elements of the supporting frame are part oval in cross-sectional shape.

References Cited by the Examiner

UNITED STATES PATENTS

| | | | |
|---|---|---|---|
| 1,532,002 | 3/1925 | Thomson | 88—105 |
| 1,888,341 | 11/1932 | Winckler | 88—105 |
| 2,152,394 | 3/1939 | Veeder | 88—105 |
| 2,477,852 | 8/1949 | Bacon. | |
| 2,537,465 | 1/1951 | Purser et al. | 88—105 |
| 2,633,439 | 3/1953 | Konstandt | 154—45.9 |
| 2,828,235 | 3/1958 | Holland et al. | |
| 2,988,959 | 6/1961 | Pelkey et al. | 88—105 |

FOREIGN PATENTS

| | | |
|---|---|---|
| 582,275 | 10/1924 | France. |
| 207,629 | 12/1923 | Great Britain. |
| 309,236 | 4/1929 | Great Britain. |
| 619,189 | 3/1949 | Great Britain. |

DAVID H. RUBIN, *Primary Examiner.*